United States Patent [19]

Ohnishi

[11] 4,356,560
[45] Oct. 26, 1982

[54] LINEAR-TRACKING PICK-UP ARM DRIVE ASSEMBLY FOR AUDIO OR VIDEO DISC PLAYER

[75] Inventor: Juniti Ohnishi, Tokorozawa, Japan

[73] Assignee: Pioneer Electronic Corporation, Tokyo, Japan

[21] Appl. No.: 260,283

[22] Filed: May 4, 1981

Related U.S. Application Data

[63] Continuation of Ser. No. 76,702, Sep. 19, 1979, abandoned.

[30] Foreign Application Priority Data

Sep. 19, 1978 [JP] Japan ............................... 53-115681
Sep. 19, 1978 [JP] Japan ............................... 53-115682

[51] Int. Cl.³ .......................... G11B 21/08; G11B 3/36
[52] U.S. Cl. .................................. 369/221; 369/230; 369/246
[58] Field of Search ............... 369/219, 220, 221, 224, 369/230, 245, 246

[56] References Cited

U.S. PATENT DOCUMENTS

| | | | |
|---|---|---|---|
| 3,418,435 | 12/1968 | Norris | 369/249 |
| 3,661,397 | 5/1972 | Worth et al. | 369/230 |
| 3,901,516 | 8/1975 | Yuki et al. | 369/245 |
| 4,007,939 | 2/1977 | Iyeta | 369/247 |
| 4,185,836 | 1/1980 | Taylor et al. | 310/12 |
| 4,200,295 | 4/1980 | Ikedo | 369/230 |

FOREIGN PATENT DOCUMENTS 55-42360 3/1980 Japan ............................... 369/221

*Primary Examiner*—Steven L. Stephan
*Attorney, Agent, or Firm*—Michael J. Striker

[57] ABSTRACT

A linear-tracking pick-up arm drive assembly for an audio or video disc player, comprising a linear motor including a magnet-carrying movable unit movable on and along a pair of spaced, parallel horizontal guide bars, and a pair of horizontally elongated, stationary armatures positioned below the guide bars, characterized in that the magnet-carrying movable unit has a pick-up arm supported above the movable unit and a permanent magnet projecting downwardly into the opening between the two stationary armatures and further in that the movable unit is supported in weight transmitting relationship on the guide bars by a three-point support mechanism which may include three rollers one of which is rollable on one of the guide bars and the others of which are rollable on the other guide bar.

13 Claims, 10 Drawing Figures

LINEAR-TRACKING PICK-UP ARM DRIVE ASSEMBLY FOR AUDIO OR VIDEO DISC PLAYER

This is a continuation of application Ser. No. 76,702, filed Sept. 19, 1979, now abandoned.

FIELD OF THE INVENTION

The present invention relates in general to audio or video disc players and, in particular, to a linear-tracking pick-up arm drive assembly for the pick-up arm of an audio or video disc player of the type in which the pick-up arm is to be driven to move linearly with respect to the turntable of the disc player.

BACKGROUND OF THE INVENTION

Conventional audio or video disc players use a pick-up arm of the offset type which is to be driven to turn about an axis parallel with the axis of rotation of the turntable so that the stylus cartridge carried by the pick-up arm travels in an arc on the grooved surface of a recording disc rotating on the turntable. As an alternative to such a pick-up arm, a linear-tracking pick-up arm has been developed with a view to eliminating the tracking error and inside force encountered in the prior-art offset type pick-up arm. The linear-tracking pick-up arm is adapted to move the stylus cartridge constantly in a direction perpendicular to a tangent to the sound groove being traced by the stylus cartridge and is driven by linear-motion drive means adapted to drive the pick-up arm in a direction parallel with the direction in which the stylus cartridge is to be moved on a rotating disc.

As the linear-motion drive means for a linear-tracking pick-up arm, a motor is preferred for its intrinsic advantages that there is no source of vibrations involved in a linear motor and that a.c. signals which tend to cause deterioration of the S/N ratio need not be used for the control of the pick-up arm. A linear motor used as the drive means for a linear-tracking pick-up arm is usually constructed by the combination of a field magnet unit and an armature unit, one of which is held stationary and the other of which is arranged to be movable with respect to the stationary unit and which carries the pick-up arm thereon. In operation, the movable unit is driven to linearly move with the pick-up arm with respect to the stationary unit by the interaction between the constant magnetic field established by the field magnet unit and a variable control field induced by the current supplied to the coil or coils forming part of the armature unit.

Whereas, a linear-tracking pick-up arm drive assembly of this nature is disclosed in the applicant's co-pending U.S. patent application Ser. No. 964,781. In the pick-up arm drive assembly therein disclosed, the movable unit constituted by the armature unit or the field magnet unit is suspended in its entirety from two spaced, parallel horizontal guide bars by means of rollers suitably arragned and the magnetic core member or members forming part of the armature unit or the permanent magnet or magnets forming part of the field magnet unit are positioned atop the movable unit. The movable unit thus arranged has a center of gravity located at a relatively high level within the drive assembly as a whole and, for this reason, can not maintain sustained stability of movement during operation of the assembly.

On the other hand, the movable unit in the applicant's formerly proposed pick-up arm drive assembly is suspended from the guide bars by two pairs of rollers. If all of these four rollers fail to be correctly sized or properly supported by the movable unit, one of the rollers tend to float over the associated guide bar and impairs the smoothness of the movement of the movable unit along the guide bars.

To permit the pick-up arm of an audio or video disc player to perform lead-in or return motions, the drive assembly for a linear-tracking pick-up arm is usually provided with lifting means operative to slightly turn the pick-up arm about a predetermined horizontal axis with respect to the movable unit of the drive assembly. To make such lifting means operable throughout the distance of strokes of the movable unit, intricate mechanical arrangements are required for the lifting means. When, furthermore, the pick-up arm is driven to tilt upwardly with respect to the movable unit, the movable unit supporting the pick-up arm tends to move laterally of the guide bars and fails to maintain proper lateral position with respect to the guide bars.

Furthermore, a linear-tracking pick-up arm is arranged to be rotatable about a vertical axis with respect to the movable unit supporting the pick-up arm so that the stylus cartridge carried by the pick-up arm is capable of correctly tracing a sound groove in a recording disc throughout operation of the audio or video disc player. If, therefore, the pick-up arm happens to be lifted in such a condition that the arm is deviated from a predetermined position longitudinally extending at a predetermined angle to the direction in which the movable unit is to travel along the guide bars, the pick-up arm may unable to have the stylus cartridge correctly positioned with respect to the sound groove to be traced by the stylus during the subsequent operation of the disc player. Such an inconvenience will occur also when the pick-up arm being lifted or held in a lifted position is subjected to any force applied in a lateral direction to the pick-up arm.

It is, accordingly, an important object of the present invention to provide a linear-tracking pick-up arm drive assembly featuring, inter alia, a movable unit which is supported with sufficient stability on guide bars and movable smoothly and reliably on and along the guide bars so that the stylus cartridge carried by the pick-up arm mounted on the movable unit is enabled to trace the sound groove in a rotating audio or video disc smoothly and accurately.

It is another important object of the present invention to provide a linear-tracking pick-up arm drive assembly in which the movable unit forming part of the drive assembly has a center of gravity which is sufficiently low within the drive assembly as a whole.

It is still another important object of the present invention in which the movable unit forming part of the drive assembly is movably supported on horizontal guide bars by bearing means which are arranged in such a manner as to enable the movable unit to move smoothly and stably on an along the guide bars.

It is still another important object of the present invention to provide a linear-tracking pick-up arm drive assembly featuring pick-up arm lifting means which is simple in construction and which is particularly useful for a linear-tracking pick-up arm drive assembly constituted by a linear motor.

It is, yet, another important object of the present invention to provide a linear-tracking pick-up arm drive assembly featuring pick-up arm lifting means capable of lifting the pick-up arm without impairing the proper positional relationship between the movable unit carrying the pick-up arm and the guide bars on which the movable unit is movably supported.

SUMMARY OF THE INVENTION

In accordance with the present invention, there is basically provided a linear-tracking pick-up arm drive assembly comprising horizontally elongated, stationary first and second guide bars which are spaced apart substantially in parallel from each other, a magnet-carrying movable unit which is supported in weight transmitting relationship on the guide bars and which is movable along the guide bars, the movable unit carrying thereon a linear-tracking pick-up arm, and a horizontally elongated, stationary armature extending on a horizontal plane lower than the guide bars, the movable unit including a stationary armature which is positioned and movable sidewise of the permanent magnet. The pick-up arm may be carried by the movable unit in such a manner as to be rotatable with respect to the movable unit about two axes substantially perpendicular to each other in intersecting or non-intersecting relationship.

BRIEF DESCRIPTION OF THE DRAWINGS

The features and advantages of the linear-tracking pick-up arm drive assembly according to the present invention will be more clearly understood from the following description taken in conjunction with the accompanying drawings, in which like reference numerals designate similar or corresponding units, members and elements and in which.

DESCRIPTION OF THE EMBODIMENTS

Figure 1:
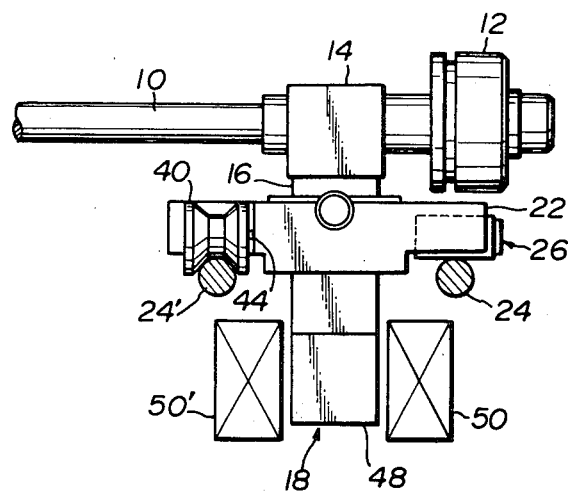
FIG. 1 is an elevation view showing a preferred embodiment of the linear-tracking pick-up arm drive assembly according to the present invention, the embodiment being viewed in a direction in which the pick-up arm is to be linearly moved by means of the drive assembly.
Figure 2:
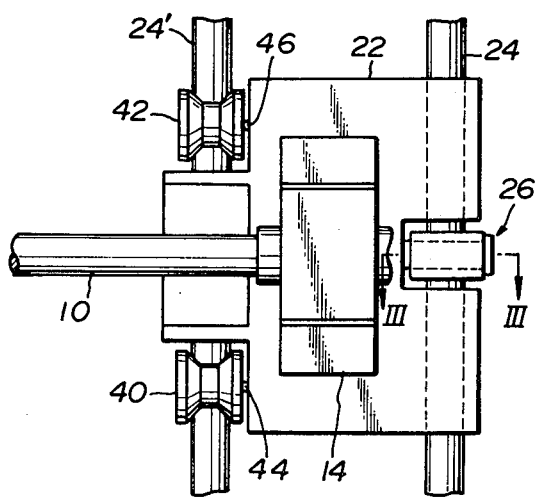
FIG. 2 is a top plan view of the embodiment illustrated in FIG. 1.

Referring to the drawings, first particularly to FIGS. 1 and 2 thereof, a linear-tracking pick-up arm drive assembly embodying the present invention comprises a linear-tracking pick-up arm 10 having a balancing weight 12 mounted on one end portion of the arm. Though not shown in the drawings, the pick-up arm 10 has a stylus cartridge carried on the other end portion of the arm. As is well known in the art, the stylus cartridge is arranged to be movable with the pick-up arm over or alongside the horizontal or vertical turntable of a video or audio disc player.

The linear-tracking pick-up arm 10 is cantilevered to an arm holder 14 which is mounted on a vertical shaft 16 axially projecting downwardly from the arm holder 14. The arm holder 14 is coupled to the shaft 16 in such a manner that the arm holder 14 and accordingly the pick-up arm 10 per se are rotatable with respect to the shaft 16 about the center axis of the shaft 16. The vertical shaft 16 is, in turn, pivotally coupled to a magnet-carrying movable unit 18 by means of a horizontal pivot pin so that the shaft 16, arm holder 14 and pick-up arm 10 are bodily rotatable with respect to the magnet-carrying movable unit 18 about the center axis of the pivot pin. The pick-up arm 10 and the arm holder 14 are, thus, rotatable with respect to the magnet-carrying movable unit 18 about the center axis of the vertical shaft 16 and the center axis of the horizontal pivot pin.

The magnet-carrying movable unit 18 has a carrier block 22 having a central portion positioned below the arm holder 14 and two side portions projecting from the central portion in opposite directions which are suitably angled with respect to the direction in which the pick-up arm 10 longitudinally extends.

The magnet-carrying movable unit 18 is movable back and forth on and along a pair of horizontally elongated guide bars 24 and 24' which are spaced apart in parallel from each other throughout the lengths thereof and which longitudinally extend each in part below the above mentioned side portions of the carrier block 22. The guide bars 24 and 24' form part of a stationary support structure of the linear-tracking pick-up arm drive assembly according to the present invention and are herein assumed by way of example, to have circular cross sections as shown in FIG. 1. The magnet-carrying movable unit 18 is supported on these guide bars 24 and 24' in weight transmitting relationship to the guide bars by three bearing means which consist of first bearing means rotatably coupled to the carrier block 22 and rollable on one guide bar 24 and second and third bearing means each rotatably coupled to the carrier block 22 and rollable on the other guide bar 24', the axis of rotation of each of the first, second and third bearing means with respect to the movable unit 18 being substantially perpendicular in non-intersecting relationship to the directions of elongation of the guide bars 24 to 24'.

In the embodiment illustrated in FIGS. 1 and 2, the first bearing means is constituted by a roller assembly 26 which is coupled to the magnet-carrying movable unit 18 through a lateral recess 28' formed in one side portion of the carrier block 22. As depicted more clearly in FIG. 3, the roller assembly 26 comprises a shaft 28 securely connected to the carrier block 22 and a cylindrical sleeve 30 rotatable on the shaft 28 about the center axis of the shaft 28. The shaft 28 has a generally cylindrical stem portion, a threaded lug portion 32 axially projecting from one axial end of the stem portion, and an annular flange portion 34 formed at the other axial end of the stem portion. The shaft 28 thus configured is securely connected to the carrier block 22 of the magnet-carrying movable unit 18 by means of the lug portion 32 screwed into the carrier block 22 in such a manner that the center axis of the shaft 28 extends above and substantially perpendicularly in non-intersecting relationship to the guide bar 24. On the other hand, the sleeve 30 is fitted to the shaft 28 in such a manner as to be slidable in circumferential direction on the peripheral surface of the stem portion of the shaft 28. The flange portion 34 of the shaft 28 prevents the sleeve 30 from being axially dislodged from the shaft 28.

Figure 3:
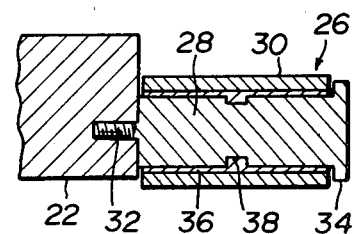
FIG. 3 is a sectional view taken on line III—III in FIG. 2.

Between the peripheral surface of the stem portion of the shaft 28 and the inner peripheral surface of the sleeve is applied a body of viscous fluid such as for example silicone oil or grease as indicated at 36 in FIG. 3. The viscous fluid thus intervening between the shaft 28 and the sleeve 30 facilitates the sleeve 30 to slide on the shaft 28 when the sleeve 30 is being driven to rotate at a relatively high speed on the shaft 28 and is effective to produce viscous friction between the shaft 28 and the sleeve 30 when the sleeve 30 is ceasing its rotation on the shaft 28. The viscous fluid in the roller assembly 26 is in this fashion utilized not only as a lubricant but as viscous friction means to brake the sleeve 30 by causing the sleeve to stick to the peripheral surface of the stem portion of the shaft 28 when the sleeve 30 which has been driven to rotate on the shaft 28 is being brought to a stop on the shaft 28. The flange portion 34 of the shaft 28 serves not only as means to prevent the sleeve 30 from being axially dislodged from the shaft 28 as above noted but for the purpose of precluding leak of the viscous fluid from between the shaft 28 and the sleeve 30. To retain the viscous fluid more effectively between the shaft 28 and the sleeve 30, the shaft 28 may be formed with at least one circumferential groove 38 in the cylindrical stem portion thereof as shown in FIG. 3. As an alternative to or in combination with the circumferential groove 38 thus formed in the stem portion of the shaft 28, at least one circumferential groove may be formed in the inner peripheral wall of the sleeve, though not shown in the drawings.

The first bearing means constituted by the roller assembly 26 thus constructed and arranged is preferably located with respect to the linear-tracking pick-up arm 10 in such a manner that the axis of rotation of the bearing means, viz., the center axis of the shaft 28 is contained in a vertical plane containing the center axis of the pick-up arm 10 as will be seen from the illustration of FIG. 2.

On the other hand, the second and third bearing means are constituted by circumferentially grooved rollers 40 and 42 which are rotatably mounted on shafts 44 and 46, respectively, axially projecting from the other side portion of the carrier block 22. The grooved rollers 40 and 42 have respective axes of rotation substantially perpendicular in non-intersecting relationship to the directions of elongation of the guide bars 24 and 24' and are in rollable engagement with the guide bar 24' through the circumferential grooves therein. The grooved rollers 40 and 42 thus constituting the second and third bearing means, respectively, are located with respect to the first bearing means or the roller assembly 26 in such a manner that the respective axes of rotation of the grooved rollers are located substantially in symmetry with respect to the above mentioned vertical plane containing the center axis of the pick-up arm 10 and the axis of rotation of the first bearing means.

The magnet-carrying movable unit 18 thus supported on and longitudinally movable along the guide bars 24 and 24' comprises a permanent magnet 48 projecting downwardly from the central portion of the carrier block 22 of the movable unit 18. The permanent magnet 48 has opposite magnetic polarities at its lateral end faces which are substantially parallel with the directions of elongation of the guide bars 24 and 24'. A pair of elongated core members (not shown) each constructed of a ferromagnetic material such as soft iron longitudinally extend substantially in parallel with the guide bars 24 and 24' and on both sides of the permanent magnet 48. Control coils 50 and 50' are helically wound on these core members, respectively, and, in combination with the core members, constitute stationary linear armatures. The magnetic core members having the control coils 50 and 50' thus wound thereon are spaced apart substantially in parallel from each other across the permanent magnet 48 and form therebetween an opening elongated in the direction in which the magnet-carrying movable unit 18 is movable. The permanent magnet 48 depending from the carrier block 22 of the movable unit 18 is longitudinally movable through this opening between the core members and form two parallel air gaps between the core members and the opposite lateral end faces of the magnet 48. The magnetic core members having the coils 50 and 50' wound thereon are secured at their opposite ends to the stationary support structure including the guide bars 24 and 24'.

In operation, an electric current is applied in a certain direction to each of the control coils 50 and 50' so that a voltage is developed between the positive and negative terminals of each control coil from a suitable power supply circuit (not shown) incorporated in the audio or video disc player. Variable control field is induced around each of the control coils 50 and 50' so that a magnetic force is produced around each control coil by the interaction between the constant flux field established by the magnet 48 and a variable control field induced by the current which transversely cuts across the constant flux field. The control coils being respectively fast on the magnetic core members which are held stationary, the magnetic forces thus exerted on the stationary armatures react on the permanent magnet 48 forming part of the magnet-carrying movable unit 18, which is as a consequence caused to move in a certain direction on and along the guide bars 24 and 24' while carrying the magnet 48 through the opening between the magnetic core members supporting the control coils 50 and 50'. If the direction of the current to be applied to each of the control coils 50 and 50' is reversed, the direction of the control field induced around each coil is also reversed and as a consequence the magnet-carrying movable unit is moved in the opposite direction on and along the guide bars 24 and 24'. The magnet-carrying movable unit 18 is thus longitudinally movable on and along the guide bars 24 and 24' in directions dictated by the directions of the current passed to the control coils 50 and 50', at velocities determined by the intensities of the current and over distances depending upon the time durations of the surrent. As the magnet-carrying movable unit 18 is moved back and forth along the guide bars 24 and 24', the linear-tracking pick-up arm 10 cantilevered to the arm holder 14 supported by the movable unit 18 is also moved linearly in directions parallel with the guide bars 24 and 24'. The movement of the pick-up arm 10 results in linear movement of the stylus cartridge on the pick-up arm with respect to the turntable rotating below or alongside the stylus cartridge. The direction of movement of the stylus cartridge with respect to the turntable is parallel with a tangent to the circular turntable. The currents to be fed to the control coils 50 and 50' may be supplied from sources similar to those forming part of the electromagnetic drive means shown in the previously named U.S. patent application Ser. No. 964,781.

The embodiment of the linear-tracking pick-up arm drive assembly hereinbefore described is characterized, inter alia, in that the permanent magnet 48 forming part of the movable unit 18 is provided below the carrier block 22 movably supported on the guide bars 24 and 24' and projects downwardly into the opening between the magnetic core members forming part of the stationary linear armatures. By reason of such construction of the linear-tracking pick-up arm drive assembly embodying the present invention, the magnet-carrying movable unit 18 has a center of gravity lower that that of the magnet-carrying movable unit of a linear pick-up arm drive assembly in which the movable unit has a magnet or magnets above the carrier block of the movable unit. The magnet-carrying movable unit 18 and accordingly the linear-tracking pick-up arm 10 mounted on the movable unit 18 are, therefore, supported and movable on the guide bars 24 and 24' in sufficiently stable condition so that the stylus cartridge carried by the pick-up arm 10 is enabled to travel smoothly on a recording disc on the turntable of the audio or video disc player. Because, furthermore, of the fact that the stationary linear armatures constructed by the control coils 50 and 50' and the magnetic core members are positioned below the magnet-carrying movable unit 18 and the guide bars 24 and 24', the center of gravity of the pick-up arm drive assembly as a whole is lower than that of a prior-art pick-up arm drive assembly.

Another outstanding feature of the embodiment of the present invention hereinbefore described is that the magnet-carrying movable unit 18 is supported on the guide bars 24 and 24' by means of a three-point support mechanism constituted by the three bearing means including the roller assembly 26 and the two grooved rollers 40 and 42. By adoption of the three-point support mechanism in supporting the magnet-carrying movable unit 18 on the guide bars 24 and 24', none of the three bearing means is permitted to float over the guide bars 24 and 24' so that all of the bearing means intervening between the magnet-carrying movable unit 18 and the guide bars 24 and 24' lend themselves to reliably supporting the movable unit 18 on the guide bars 24 and 24' in weight transmitting relationship to the guide bars.

Figure 4:
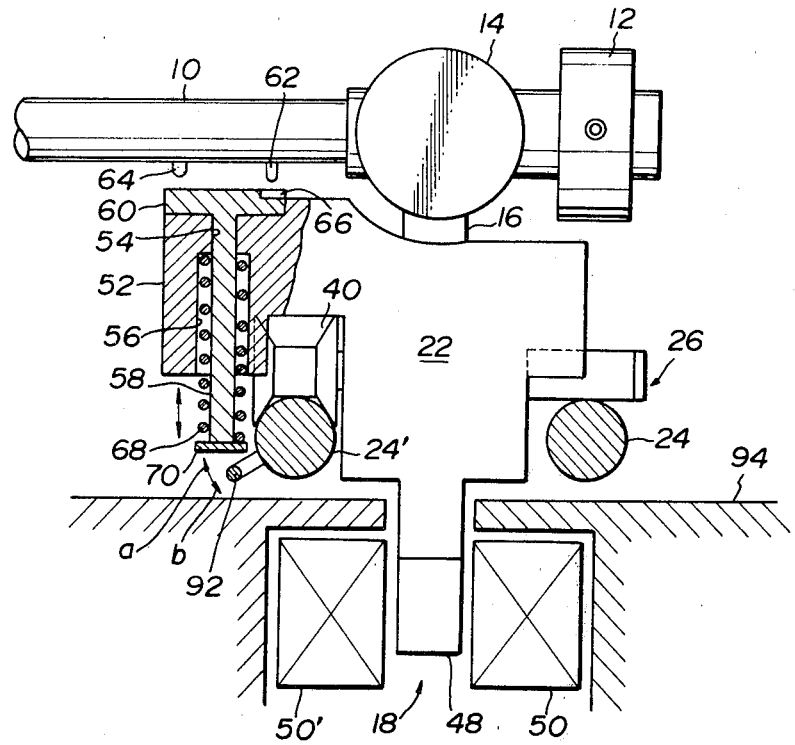
FIG. 4 is a view similar to FIG. 1 but shows a modification of the embodiment shown therein.

FIG. 4 shows a linear-tracking pick-up arm drive assembly including pick-up arm lifting means added to the embodiment of FIGS. 1 and 2. The pick-up arm lifting means comprises a support 52 integral with or otherwise securely attached to the carrier block 22 of the magnet-carrying movable unit 18. The support 52 is formed with a vertical guide hole 54 which is open at the upper end of the support 52 and a vertical hole 56 larger in cross section than the vertical guide hole 54 and extending downwardly from the guide hole 54 as shown. A flanged lifting member 58 has a vertical rod portion slidably extending through the guide hole 54 and projecting through the vertical hole 56 downwardly from the support 52. The lifting member 58 further has at the upper end of the rod portion a flange portion 60 having a flat upper face. The lifting member 58 is positioned below a portion of the pick-up arm 10 so that the flange portion 60 thereof is engageable with the particular portion of the pick-up arm 10. In the embodiment herein illustrated, the pick-up arm 10 is shown provided with two pins 62 and 64 projecting downwardly from the above mentioned portion of the pick-up arm 10 toward the flat upper face of the flange portion 60 of the lifting member 58 so that the flange portion 60 is brought into abutting contact with these pins 62 and 64 on the pick-up arm 10 when the lifting member 58 is moved upwardly through the guide hole 54 in the support 52. The flange portion 60 of the lifting member 58 is preferably formed with a groove 66 located to be capable of capturing one of the pins such as the pin 62 therein when the flange portion 60 is brought into abutting engagement with the pins 60 and 62. The groove 66 may have a V-shaped cross section and is useful for holding the pick-up arm 10 correctly in a predetermined position with respect to the support 52 and accordingly to the magnet-carrying movable unit 18 and preventing the pick-up arm 10 from turning about the vertical center axis of the shaft 16 when the lifting member 58 is in engagement with the pins 62 and 64 on the pick-up arm 10. The lifting member 58 is urged to move downwardly away from the pick-up arm 10, viz., to be seated on the upper end face of the support 52 as shown by suitable biasing means such as a preloaded helical compression spring 68. The spring 68 has the rod portion of the lifting member 58 axially passed therethrough and is seated at one end on the annular end face defining the upper end of the vertical hole 56 in the support 52 and at the other end on a retainer element 70 securely attached to the lower end face of the rod portion of the lifting member 58 as shown. The retainer element 70 has attached to the lower end face thereof a suitable frictional layer (not shown) of, for example, rubber for the reason which will be clarified as the description proceeds. The rod portion of the lifting member 58 downwardly terminates sidewise of the guide bar 24' so that the retainer element 70 is movable upwardly and downwardly adjacent to and sidewise of the guide bar 24'.

Figure 5:
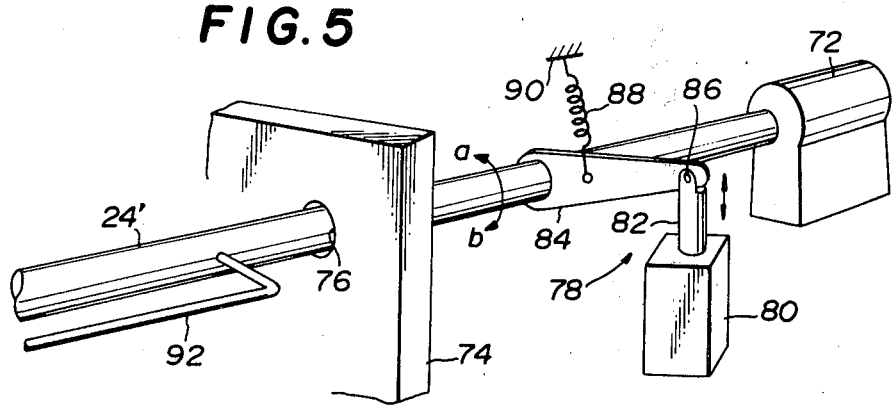
FIG. 5 is a fragmentary perspective view showing part of the embodiment illustrated in FIG. 4.

The guide bar 24' associated with the lifting member 58 thus arranged has its opposite axial end portion journaled in suitable support members one of which is shown at 72 in FIG. 5 and is rotatable about its center axis with respect to the support members 72 which are held stationary. If desired, the guide bar 24' may be rotatably passed through a suitable stay 74 formed with a hole 76 and located outside the path of the magnet-carrying movable unit 18 which is longitudinally movable along the guide bar 24'. The guide bar 24' thus arranged is provided with drive means adapted to drive the guide bar 24' to turn about the center axis thereof in opposite directions indicated by arrowheads a and b in FIG. 5. In FIG. 5, the drive means is shown, by way of example, to be constituted by a solenoid-operated lever assembly 78 comprising a solenoid unit 80 having a plunger 82 which is axially movable in directions substantially perpendicular in non-intersecting relationship to the center axis of the guide bar 24'. The solenoid unit 80 is arranged so that the plunger 82 assumes a retracted axial position when the solenoid unit 80 remains deenergized and to axially project forwardly when the solenoid unit 80 is energized. A lever 84 is pivotally connected at one end to the plunger 82 of the solenoid unit 80 by means of a pivot pin 86 and is securely connected to the guide bar 24'. The lever 84 is thus adapted to convert reciprocating movements of the plunger 82 of the solenoid unit 80 into rotational motions of the guide bar 24' about the center axis of the guide bar. Suitable biasing means is provided to urge the lever 82 to turn about the center axis of the guide bar 24' in a direction to cause the plunger 82 of the solenoid unit 80 to protrude forwardly, viz., in a direction to cause the guide bar 24' to turn about its center axis in a clockwise direction a in FIG. 4. In FIG. 5, such biasing means is shown comprising a preloaded helical compression spring 88 which is anchored at one end to the lever 84 and at the other end to a suitable stationary member 90. The drive means thus arranged is located with respect to the guide bar 24' in such a manner that will not interfere with the movement of the magnet-carrying movable unit 18 along the guide bar 24' and is preferably positioned intermediate between the support member 72 and the stay 74 as shown in FIG. 5. Though not shown in the drawings, the solenoid unit 80 includes a solenoid coil connected to a power source across a suitable switch so that the plunger 82 is caused to axially retract against the force of the spring 88 when the switch is closed to energize the solenoid unit 80

The guide bar 24' has securely fitted thereto an abutment member 92 consisting of an elongated longitudinal portion extending in parallel with the guide bar 24' and a pair of bent end portions perpendicularly bent from the longitudinal portion and secured at their ends to the guide bar 24' as will be better seen from FIG. 5. The abutment member 92 extends throughout the path of the magnet-carrying movable unit 18 and is engageable with the lower face of the retainer element 70 attached to the lifting member 58 so that the longitudinal portion of the abutment member 92 is brought into upwardly pressing engagement with the retainer element 70 and causes the lifting member 58 to axially move upwardly through the support 52 against the force of the spring 68 when the guide bar 24' is driven to turn about the center axis thereof in the direction indicated by the arrowhead a.

When, in operation, the switch intervening between the coil of the solenoid unit 80 and the power source therefor is held in a closed condition so that the solenoid unit 80 remains energized, the plunger 82 of the solenoid unit 80 is maintained in the retracted axial position thereof and holds the lever 84 in an angular position maintaining the guide bar 24' in a predetermined limit angular position in a direction indicated by arrowhead b against the force of the spring 88. Under these conditions, the abutment member 92 secured to the guide bar 24' is disengaged from the retainer element 70 on the lifting member 58, which is accordingly held in an axial position having its upper flange portion 60 seated on the upper end face of the support 52 by the force of the spring 68 as shown in FIG. 4. The flange portion 60 of the lifting member 58 is thus spaced apart downwardly from the pins 62 and 64 on the linear-tracking pick-up arm 10, which is as a consequence held in a horizontal position allowing the audio or video disc player to maintain a playback or shutoff condition.

When the switch between the coil of the solenoid unit 80 and the power source therefor is made open and the solenoid unit 80 is de-energized under these conditions, the plunger 82 of the solenoid unit 80 is caused to project forwardly by the force of the spring 88 acting on the lever 84 with the result that the guide bar 24' is caused to turn about the center axis thereof in the direction of the arrowhead a. The abutment member 92 on the guide bar 24' is now brought into pressing engagement with the retainer element 70 attached to the lifting member 58 and causes the lifting member 58 to move upwardly through the guide hole 54 in the support 52 against the force of the spring 68. The upper flange portion 60 of the lifting member 58 is brought into upwardly pressing engagement with the pins 62 and 64 on the linear-tracking pick-up arm 10 and causes the pick-up arm 10 to upwardly incline about a horizontal axis of rotation thereof with respect to the magnet-carrying movable unit 18. The pick-up arm 10 is thus allowed to be driven for lead-in or return motion with respect to the turntable of the audio or video disc player. The frictional layer attached to the lower face of the retainer element 70 serves to prevent the lifting member 58 from slipping on the abutment member 92 holding the lifting member 58 in a raised axial position and accordingly prevent the magnet-carrying movable unit 18 from being moved in a lateral direction on the guide bars 24 and 24'. The frictional layer thus attached to the retainer element 70 may be substituted by a suitable frictional element or layer applied to the longitudinal portion of the abutment member 92.

When the solenoid unit 80 is energized from the conditions above described, the plunger 82 of the solenoid unit 80 is caused to axially retract and causes the guide bar 24' to turn about the center axis thereof in the direction of the arrowhead b by the force of the spring 88 acting on the lever 84. The abutment member 92 on the guide bar 24' is now disengaged from the retainer element 70 with the result that the lifting member 58 is caused to move downwardly by the force of the spring 68 until the upper flange portion 60 thereof is seated on the upper end face of the support 52, allowing the pick-up arm 10 to restore its horizontal position with respect to the movable unit 18.

The pins 62 and 64 projecting downwardly from the linear-tracking pick-up arm 10 are spaced apart a predetermined distance from each other in a longitudinal direction of the pick-up arm 10. When the lifting member 58 is moved upwardly toward the pick-up arm 10, the pin 64 closer to the leading end of the pick-up arm 10 is first contacted by the flange portion 60 of the lifting member 58 and thereafter the pin 62 remoter from the leading end of the pick-up arm 10 is received in the groove 66 in the flange portion 60 of the lifting member 58. The pick-up arm 10 is, thus, caused to incline upwardly from its horizontal position initially by the pin 64 closer to the leading end of the pick-up arm 10 so that the stylus cartridge carried by the pick-up arm 10 is moved from the recording disc on the turntable upon engagement between the particular pin 64 and the flange portion 60 of the lifting member 58. The pin 62 remoter from the stylus cartridge on the pick-up arm 10 is allowed to enter the groove 66 in the flange portion 60 of the lifting member 58 after the stylus cartridge on the pick-up arm 10 has been separated from the recording disc on the turntable. This assures the pick-up arm 10 to correctly maintain its predetermined operative position with respect to the magnet-carrying movable unit 18 when the pick-up arm 10 is being moved into and thereafter held in an upwardly inclined position by the lifting member 58.

Figure 6:
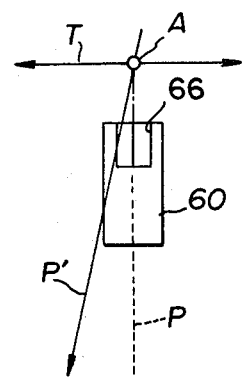
FIG. 6 is a schematic view showing the directions in which the linear-tracking pick-up arm to be driven by the drive assembly illustrated in FIG. 4 is to move with respect a member forming part of pick-up arm lifting means incorporated in the drive assembly.
Figure 7A:
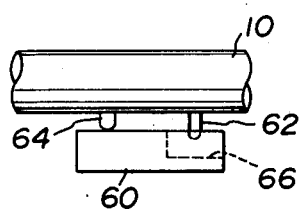
FIGS. 7A and 7B are fragmentary longitudinal and axial end views, respectively, showing a portion of the pick-up arm being driven to move upwardly by the pick-up arm lifting means forming part of the embodiment illustrated in FIG. 4.
Figure 7B:
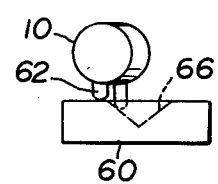
Figure 8A:
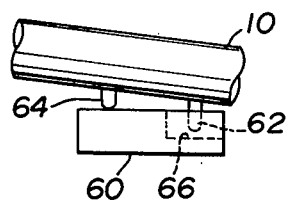
FIGS. 8A and 8B are views similar to FIGS. 7A and 7B, respectively, but show the pick-up arm which has been lifted into a predetermined position by the pick-up arm lifting means.
Figure 8B:
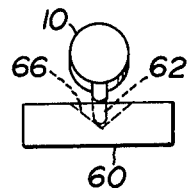

The groove 66 in the upper flange portion 60 of the lifting member 58 has a V-shaped cross section as previously noted. The bottom line of the groove 66 is substantially perpendicular to the directions T of movement of the magnet-carrying movable unit 18 and accordingly of the linear-tracking pick-up arm 10 and is contained in a vertical plane containing the vertical axis A of rotation of the pick-up arm 10 with respect to the movable unit 18, as schematically indicated in FIG. 6. When the pin 62 on the pick-up arm 10 is completely fitted into the groove 66, therefore, the pick-up arm 10 extends in a direction P substantially perpendicular to the directions T of movement of the pick-up arm 10 along the guide bars 24 and 24' as indicated by broken line in FIG. 6. If, however, it happens that the pick-up arm 10 extends in a direction P' slightly deviated from the proper direction P as is also indicated in FIG. 6, the pin 62 remoter from the leading end of the pick-up arm 10 will be located above one of the downwardly slanting surfaces defining the groove 66 in the flange portion 60 of the lifting member 58 at a point of time when the lifting member 58 is brought into abutting engagement with the pin 64 closer to the leading end of the pick-up arm 10, as will be seen from FIGS. 7A and 7B. By the abutting engagement of the lifting member 58 with the pin 64 closer to the leading end of the pick-up arm 10, the stylus cartridge carried by the pick-up arm 10 is moved from the grooved surface of the recording disc on the turntable and, as a consequence, the pick-up arm 10 is allowed to horizontally swivel about its vertical axis of rotation. As the lifting member 58 is moved upwardly toward the pick-up arm 10, the pin 62 remoter from the leading end of the pick-up arm 10 comes into contact with one of the slanting surfaces defining the groove 66 in the flange portion 62 of the lifting member 58 and thereafter slides on the particular surface toward the bottom line of the groove 66. When the pin 62 thus moved within the groove 66 reaches the bottom line of the groove 66 as indicated in FIGS. 8A and 8B, the pick-up arm 10 extends in the proper direction P perpendicular to the directions T of movement of the pick-up arm 10 along the guide bars 24 and 24' as indicated in FIG. 6 and is correctly maintained in its predetermined position with respect to the magnet-carrying movable unit 18.

It will be apparent that the arrangement shown in FIG. 4 may be modified in such a manner that pins similar to the pins 62 and 64 are provided on the flange portion 60 of the lifting member 58 and a groove similar to the groove 66 in the flange portion 60 is formed in the pick-up arm 10.

The embodiment illustrated in FIG. 4 is thus advantageous not only in that the magnet-carrying movable unit 18 has a lowered center of gravity but the pick-up arm lifting means for the linear-tracking pick-up arm 10 can be constructed by simple modification of the movable unit and some other elements forming part of the linear motor. The lifting means in the embodiment herein shown has been described to operate by the rotational motions of the guide bar 24' but it will be apparent that the upward movement of the lifting member 58 can be achieved not by having recourse to such motions of the guide bar but by the use of any suitable mechanism such as, for example, directly by the drive means including the solenoid unit 80.

The embodiments which have been herein described are further advantageous in that, since the stationary armatures and the magnet forming part of the movable unit 18 are positioned below the carrier block supporting the magnet, the magnet and the armatures can be encased within a suitable chassis 94 as indicated in FIG. 4 so as to improve the external appearance of the disc player as a whole. It may be also mentioned that the drive assembly proposed by the present invention is advantageous in that the armature unit consists of two spaced parallel armatures because the magnetic fields to be created around opposite end positions of the armatures when the armatures are excited can be cancelled by the magnetic field of the permanent magnet if the directions of turns of the armature coils and the directions in which currents are to be passed through the coils are selected properly.

What is claimed is:

1. A linear-tracking pick-up arm drive assembly for a disc player, comprising horizontally elongated, stationary first and second guide bars spaced apart substantially in parallel from each other; a movable unit supported in weight transmitting relationship on said guide bars and movable along the guide bars, said movable unit carrying thereon a linear-tracking pick-up arm having a leading end and rotatable with respect to said movable unit about a substantially horizontal axis substantially perpendicular to the direction of elongation of said pick-up arm; electromagnetic drive means for driving said movable unit along said guide bars; and pick-up arm lifting means engageable with said pick-up arm for turning said pick-up arm upwardly about said horizontal axis with respect to said movable unit, said lifting means including a lifting member supported by said movable unit and vertically movable with respect to said movable unit and said pick-up arm, and drive means for vertically driving said lifting member, said pick-up arm having a first projection and a second projection, said projection and said second projection being spaced from one another in the direction of elongation of said pick-up arm and projecting downward toward said lifting member, said first projection being remoter from said leading end of the pick-up arm than said second projection, said lifting member being formed with an open-ended groove positioned below said first projection and adapted to capture said first projection when said lifting member is brought into engagement with said pick-up arm.

2. A linear-tracking pick-up arm drive assembly as set forth in claim 1, in which said pick-up arm has a predetermined position longitudinally extending at a predetermined angle to the direction in which said magnet-carrying movable unit is movable along said guide bars, wherein said groove in said lifting member is horizontally elongated in a vertical plane containing the center axis of the pick-up arm in said predetermined position.

3. A linear-tracking pick-up arm drive assembly as set forth in claim 2, in which said groove has a substantially V-shaped cross section.

4. A linear-tracking pick-up arm drive assembly as set forth in claim 3, in which said groove has a bottom line contained in said vertical plane.

5. A linear-tracking pick-up arm drive assembly as set forth in claim 1, in which said lifting means further comprises biasing means urging said lifting member to move downwardly away from said pick-up arm.

6. A linear tracking pick-up arm drive assembly for a disc player, comprising horizontally elongated, stationary first and second guide bars spaced apart substantially in parallel from each other; a movable unit supported in weight transmitting relationship on said guide bars and movable along the guide bars, said movable unit carrying thereon a linear-tracking pick-up arm having a leading end and rotatable with respect to said movable unit about a substantially horizontal axis substantially perpendicular to the direction of elongation of said pick-up arm; electro-magnetic drive means for driving said movable unit along said guide bars; and pick-up arm lifting means engageable with said pick-up arm for turning the pick-up arm upwardly about said horizontal axis with respect to said movable unit, one of said guide bars being rotatable about a predetermined axis substantially parallel to said horizontal axis, said lifting means including drive means operative for turning said rotatable guide bar in two opposite directions through a predetermined angle about said predetermined axis, an abutment member secured to said rotatable guide bar and rotatable therewith about said predetermined axis, and a lifting member supported by said movable unit and veritcally movable with respect to said movable unit and said pick-up arm, said abutment member being engageable with said lifting member when said rotatable guide bar is caused to rotate in a predetermined direction about said predetermined axis, said lifting member being engageable with said pick-up arm and being brought into upwardly pressing engagement with said pick-up arm when engaged by said abutment member.

7. A linear-tracking pick-up arm drive assembly as set forth in claim 6, in which said pick-up arm has a first projection and a second projection, said first projection and said second projection being spaced from one another in the direction of elongation of said pick-up arm and projecting downwardly toward said lifting member, said first projection being remoter from said leading end of the pick-up arm than said second projection, said lifting member being formed with an open-ended groove positioned below said first projection and adapted to capture said first projection when said lifting number is brought into engagement with said pick-up arm.

8. A linear-tracking pick-up arm drive assembly as set forth in claim 7, in which said lifting means further comprises a frictional layer which intervenes between said lifting member and said abutment member when the abutment member is in engagement with the lifting member.

9. A linear-tracking pick-up arm drive assembly as set forth in claim 8, in which said frictional layer is securely attached to said lifting member.

10. A linear-tracking pick-up arm drive assembly as set forth in claim 8, in which said frictional layer is securely attached to said abutment member.

11. A linear-tracking pick-up arm drive assembly as set forth in claim 7, in which said abutment member has a longitudinal portion elongated throughout the distance of strokes of said movable unit and engageable with said lifting member throughout said distance.

12. A linear-tracking pick-up arm drive assembly as set forth in claim 9, in which said abutment member has a longitudinal portion elongated throughout the distance of strokes of said movable unit and engageable with said lifting member throughout said distance.

13. A linear-tracking pick-up arm drive assembly as set forth in claim 10, in which said abutment member has a longitudinal portion elongated throughout the distance of strokes of said movable unit and engageable with said lifting member throughout said distance.

* * * * *